United States Patent Office

2,986,450
Patented May 30, 1961

2,986,450

STABILIZATION OF SULFUR TRIOXIDE AND HIGH STRENGTH OLEUMS

James R. Jones, Tonawanda, and Russell F. Fogle, Jr., Niagara Falls, N.Y., assignors to Olin Mathieson Chemical Corporation, a corporation of Virginia No Drawing. Filed Mar. 21, 1958, Ser. No. 722,830

19 Claims. (Cl. 23—174)

This invention relates to the stabilization of sulfur trioxide and high strength oleums.

Three sulfur trioxide polymers are known to form in sulfur trioxide and in high strength oleums. They are commonly denoted as alpha, beta and gamma. The melting points of these polymers are, respectively, 62° C., 33° C., and 17° C. It is advantageous to stabilize and thereby inhibit polymerization of sulfur trioxide to the alpha and beta forms as liquefaction of these polymers is not easily accomplished, and liquefaction of the alpha polymer is hazardous due to the sudden increase in vapor pressure which occurs at the melting temperature. Heretofore, nitrosyl compounds, boron compounds and carbon tetrachloride have been used to stabilize sulfur trioxide and high strength oleums.

The present invention provides the art with another means whereby stabilized sulfur trioxide and high strength oleum compositions can be prepared. Thus, we have discovered that sulfur trioxide and oleum of at least about 80% strength can be stabilized by incorporating therein not more than 2% by weight and preferably 0.1% to 1.0% by weight of certain nitrogen-containing aromatic compounds. As little as about 0.01% by weight is sufficient in some circumstances. Accordingly, the present invention provides a method of stabilizing sulfur trioxide and high strength oleum, and also provides a stabilized sulfur trioxide and a stabilized high strength oleum composition. The method of the invention comprises adding to sulfur trioxide or oleum of at least about 80% strength not more than 2% by weight of the aromatic compound. It is not known whether the aromatic compound is present as such in the compositions of the invention or whether it is present therein as a reaction product or products of the aromatic compound and sulfur trioxide. Hence, the composition of the invention can best be defined as sulfur trioxide or oleum of at least about 80% strength which has been stabilized by the addition thereto of not more than 2% by weight of the aromatic compound.

Many non-aromatic and many aromatic organic compounds were tested as sulfur trioxide stabilizers. The non-aromatic organic compounds were found to be either useless or effective only to prevent the formation of the alpha polymer. In those cases in which non-aromatic organic compounds did inhibit polymerization, the effect was temporary as only a trace of moisture would bring about complete polymerization to the alpha form. The nitrogen-containing aromatic compounds, on the other hand, all inhibited the formation of the alpha polymer, and about 80% of the aromatic compounds tested inhibited the formation of the beta polymer. Moreover, sulfur trioxide or high strength oleum stabilized with the aromatic compounds was found to be substantially more resistant to the action of moisture than was the sulfur trioxide stabilized with non-aromatic compounds. Further, when kept in moisture proof containers, sulfur trioxide or high strength oleum treated according to the invention with aromatic compounds which inhibit the formation of the alpha and beta polymers can be stored at normal atmospheric temperatures without either of these polymers being formed. The compositions of the invention, however, will polymerize upon prolonged exposure to atmospheric moisture so that this should be avoided.

The nitrogen-containing aromatic compounds useful in this invention are aromatic amines, aromatic amides, aromatic isothiocyanates, aromatic hydrazines and aromatic nitro compounds.

The aromatic amines include aryl amines, for example, phenylamines such as aniline, diphenylamine, and m-phenylenediamine, and alkylphenylamines such as o-toluidine, p-toluidine and dimethylaniline. The aromatic amides include, for example, phenylacetamide. The aromatic isothiocyanates include, for example, phenyl isothiocyanate. The aromatic hydrazines include, for example, phenylhydrazine, diphenylhydrazine and tetraphenylhydrazine. The aromatic nitro compounds include, for example, pentachloronitrobenzene. Preferably, in the above compounds the alkyl group contains from 1 to 4 carbon atoms.

The nitrogen-containing aromatic compounds can be represented by the following formula $$Ar-X_n$$

wherein Ar is an aryl nucleus of 6 to 14 ring carbon atoms, e.g. phenyl, diphenyl, and fused ring aromatics of 10 to 14 carbon atoms, e.g. naphthyl, tetrahydronaphthyl, fluorenyl, anthryl and phenanthryl, and the alkyl and halogen substituted derivatives thereof; X is nitro (—$NO_2$), isothiocyano (—CNS), amino (—$NR_2$), hydrazino (—$NRNR_2$), amido (—$CONR_2$) and alkamido (—$R'CONR_2$) wherein R is hydrogen, alkyl or aryl and R' is alkylene; and n is 1 to 14 depending on the number of ring carbon atoms in the Ar nucleus, i.e. 1 to 6 when Ar has 6 ring carbon atoms or greater when Ar has more than 6 ring carbon atoms; i.e. is a polynuclear aryl nucleus. When n is more than 1, X can be the same or different. The alkyl and alkylene substituents are preferably of 1 to 4 carbon atoms.

In the practice of the invention, the aromatic compounds used can be added to liquid sulfur trioxide or high strength oleum. A small amount of sludge or oily liquid as a second phase frequently forms in the resulting solution (i.e. treated sulfur trioxide or high strength oleum) and depending on the aromatic compound used, color may be imparted to the solution. If desired, the sludge or oily liquid can be removed by any suitable means. Thus, sludge may be removed by filtration or oily liquid may be separated from the solution by decantation. However, whether the sludge or oily liquid is removed or not, the treated sulfur trioxide or high strength oleum is effectively stabilized.

In general, the less completely aromatic the stabilizing agent and the larger the non-aromatic groups thereof, the greater is the amount of sludge formation and the lower is the degree of stabilization. Complete substitution for the hydrogen of the aromatic nucleus or nuclei is preferably avoided.

The method of this invention also includes adding one of the defined aromatic compounds to the sulfur trioxide and oleum, separating sulfur trioxide from the resulting mixture and adding some of the resulting residue to the material to be stabilized, the total amount of aromatic compound added being not more than 2% by weight based on the weight of the finally stabilized composition.

The following examples describe specific embodiments of the invention.

Example 1

Four-tenths of a gram of aniline was placed in a receiving tube into which 65.1 grams of liquid sulfur trioxide was distilled. The composition contained 0.61 percent of aniline. The sample was frozen and placed in a water bath at 15 to 17° C. It melted completely showing effective stabilization of the sulfur trioxide.

Example 2

Three-tenths of a gram of diphenylamine was placed in a receiver and 46.1 grams of liquid sulfur trioxide was condensed in the same tube. The composition contained 0.65 percent of added diphenylamine. The resulting mixture was frozen and remelted in a water bath at 15° C. The liquid sulfur trioxide was completely stabilized.

Example 3

Sulfur trioxide was condensed as a liquid in a receiving tube containing tetraphenylhydrazine until the composition contained 0.5 percent of tetraphenylhydrazine. The mixture was frozen in Dry Ice and then held in a water bath at 15 to 17° C. It melted completely showing that the sulfur trioxide was stabilized against polymerization.

Example 4

Three-tenths of a gram of phenylacetamide was placed in a receiver and 58.4 grams of liquid sulfur trioxide was introduced to yield a composition containing 0.51 percent of phenylacetamide. The sample was frozen in Dry Ice and placed in a water bath at 15 to 17° C. It melted leaving no residue showing complete stabilization.

Example 5

Three-tenths of a gram of pentachloronitrobenzene was placed in a receiving tube and 62.9 grams of liquid sulfur trioxide was introduced to yield a composition containing 0.475 percent of pentachloronitrobenzene. The sample was frozen and then placed in a water bath at 15 to 17° C. About half of the composition melted at this temperature showing partial stabilization.

Examples 6 and 7

The following compounds were found to prevent the formation of the alpha and beta polymers both in the original mixtures obtained by the addition of the compounds to liquid sulfur trioxide and in the filtrate obtained after standing and removal by filtration of any solid reaction product.

| Example | Stabilizer | Percent by weight originally added |
|---|---|---|
| 6 | Tetraphenylhydrazine | 0.57 |
| 7 | Phenylisothiocyanate | 0.805 |

In each of these examples, stabilization of the original mixture and of the filtrate was such that following freezing of samples of the original mixture and of the filtrate by contacting vessels containing the samples with Dry Ice and then placing the vessels in a water bath maintained at 15 to 17° C., the sulfur trioxide of each sample melted completely.

Example 8

A mixture comprising 0.3 gram of diphenylamine and 30 grams of sulfur trioxide was distilled under vacuum (10 mm. Hg) until 29.5 grams of sulfur trioxide were removed. The residue was mixed with 45 grams of fresh, unstabilized sulfur trioxide. This new mixture was sealed in a testing vial and frozen in a Dry Ice-acetone bath. The vial was later placed in a water bath at 15 to 17° C. whereupon the contents melted completely showing complete stabilization of the sulfur trioxide.

The sulfur trioxide used in the foregoing examples was substantially pure sulfur trioxide such as may be obtained by distillation of say 30% oleum, or by compression and condensation of sulfur trioxide from a mist free sulfur dioxide-sulfur trioxide gas mixture obtained from a sulfur dioxide converter.

The sulfur trioxide composition of the invention can be used in a wide variety of organic sulfonations and sulfations. For example, sulfur trioxide stabilized with aniline according to the invention may be used to sulfate stearyl alcohol.

This application is a continuation-in-part of pending application Serial No. 561,364, filed January 25, 1956.

What is claimed is:

1. The method of stabilizing material selected from the group consisting of liquid sulfur trioxide and oleum of at least about 80% strength which comprises adding thereto in an amount at least effective to stabilize the sulfur trioxide and oleum but not more than 2% by weight of a nitrogen-containing aromatic compound selected from the group consisting of aryl amines, aryl amides, aryl isothiocyanates, aryl hydrazines and aryl nitro compounds, wherein the aryl group of the said amines, amides, isothiocyanates, hydrazines and nitro compounds is selected from the group consisting of phenyl, alkylphenyl wherein the alkyl group contains from 1 to 4 carbon atoms, phenylalkyl wherein the alkyl group contains from 1 to 4 carbon atoms, and chlorophenyl.

2. The method of claim 1 wherein said compound is added to liquid sulfur trioxide.

3. The method of stabilizing liquid sulfur trioxide which comprises adding thereto 0.1% to 1% by weight of aniline.

4. The method of stabilizing liquid sulfur trioxide which comprises adding thereto 0.1% to 1% by weight of diphenylamine.

5. The method of stabilizing liquid sulfur trioxide which comprises adding thereto 0.1% to 1% by weight of phenylacetamide.

6. The method of stabilizing liquid sulfur trioxide which comprises adding thereto 0.1% to 1% by weight of phenyl isothiocyanate.

7. The method of stabilizing liquid sulfur trioxide which comprises adding thereto 0.1% to 1% by weight of tetraphenylhydrazine.

8. The method of stabilizing liquid sulfur trioxide which comprises adding thereto 0.1% to 1% by weight of pentachloronitrobenzene.

9. The method of stabilizing material selected from the group consisting of liquid sulfur trioxide and oleum of at least about 80% strength which comprises adding a nitrogen-containing aromatic compound thereto, separating sulfur trioxide from the resulting mixture and adding some of the residue remaining after separation of the sulfur trioxide to the material to be stabilized, the total amount of said aromatic compound added being in an amount at least effective to stabilize the sulfur trioxide and oleum but not more than 2% by weight based upon the weight of the finally stabilized composition, said aromatic compound being selected from the group consisting of aryl amines, aryl amides, aryl isothiocyanates, aryl hydrazines and aryl nitro compounds, wherein the aryl group of the said amines, amides, isothiocyanates, hydrazines and nitro compounds is selected from the group consisting of phenyl, alkylphenyl wherein the alkyl group contains from 1 to 4 carbon atoms, phenylalkyl wherein the alkyl group contains from 1 to 4 carbon atoms, and chlorophenyl.

10. A stabilized composition consisting essentially of material selected from the group consisting of liquid sulfur trioxide and oleum of at least about 80% strength, said material having been stabilized by the addition thereto of an amount at least effective to stabilize the sulfur trioxide and oleum but not more than 2% by weight of a nitrogen-containing aromatic compound selected from the group consisting of aryl amines, aryl amides, aryl isothiocyanates, aryl hydrazines and aryl nitro compounds, wherein the aryl group of the said amines, amides, isothiocyanates, hydrazines and nitro compounds is selected from the group consisting of phenyl, alkylphenyl wherein the alkyl group contains from 1 to 4 carbon atoms, phenylalkyl wherein the alkyl group contains from 1 to 4 carbon atoms, and chlorophenyl.

11. A stabilized liquid sulfur trioxide composition consisting essentially of liquid sulfur trioxide stabilized by the addition thereto of 0.1% to 1% of aniline.

12. A stabilized liquid sulfur trioxide composition consisting essentially of liquid sulfur trioxide stabilized by the addition thereto of 0.1% to 1% of diphenylamine.

13. A stabilized liquid sulfur trioxide composition consisting essentially of liquid sulfur trioxide stabilized by the addition thereto of 0.1% to 1% of phenylacetamide.

14. A stabilized liquid sulfur trioxide composition consisting essentially of liquid sulfur trioxide stabilized by the addition thereto of 0.1% to 1% of phenyl isothiocyanate.

15. A stabilized liquid sulfur trioxide composition consisting essentially of liquid sulfur trioxide stabilized by the addition thereto of 0.1% to 1% of tetraphenylhydrazine.

16. A stabilized liquid sulfur trioxide composition consisting essentially of liquid sulfur trioxide stabilized by the addition thereto of 0.1% to 1% of pentachloronitrobenzene.

17. The method of stabilizing material selected from the group consisting of liquid sulfur trioxide and oleum of at least about 80% strength which comprises adding thereto in an amount at least effective to stabilize the sulfur trioxide and oleum but not more than 2% by weight of a nitrogen-containing aromatic compound of the formula $$Ar-X_n$$

wherein Ar is an aryl hydrocarbon nucleus of 6 to 14 ring carbon atoms and the halogen and alkyl of 1 to 4 carbon atoms substituted derivatives thereof, X is selected from the group consisting of nitro, isothiocyano, $-NR_2$, $-NRNR_2$, $-CONR_2$ and $-R'CONR_2$ wherein R is selected from the group consisting of alkyl of 1 to 4 carbon atoms, phenyl and alkylphenyl in which the alkyl group contains from 1 to 4 carbon atoms, and R' is alkylene of 1 to 4 carbon atoms, and $n$ is an integer of 1 to 14.

18. The method of stabilizing material selected from the group consisting of liquid sulfur trioxide and oleum of at least about 80% strength which comprises adding a nitrogen-containing aromatic compound thereto, separating sulfur trioxide from the resulting mixture and adding some of the residue remaining after the separation of the sulfur trioxide to the material to be stabilized, the total amount of said aromatic compound added being in an amount at least effective to stabilize the sulfur trioxide and oleum but not more than 2% by weight based upon the weight of the finally stabilized composition, said aromatic compound being of the formula $$Ar-X_n$$

wherein Ar is an aryl hydrocarbon nucleus of 6 to 14 ring carbon atoms and the halogen and alkyl of 1 to 4 carbon atoms substituted derivatives thereof, X is selected from the group consisting of nitro, isothiocyano, $-NR_2$, $-NRNR_2$, $-CONR_2$ and $-R'CONR_2$ wherein R is selected from the group consisting of alkyl of 1 to 4 carbon atoms, phenyl and alkylphenyl in which the alkyl group contains from 1 to 4 carbon atoms, and R' is alkylene of 1 to 4 carbon atoms, and $n$ is an integer of 1 to 14.

19. A stabilized composition consisting essentially of material selected from the group consisting of liquid sulfur trioxide and oleum of at least about 80% strength, said material having been stabilized by the addition thereto in an amount at least effective to stabilize the sulfur trioxide and oleum but not more than 2% by weight of a nitrogen-containing aromatic compound of the formula $$Ar-X_n$$

wherein Ar is an aryl hydrocarbon nucleus of 6 to 14 ring carbon atoms and the halogen and alkyl of 1 to 4 carbon atoms substituted derivatives thereof, X is selected from the group consisting of nitro, isothiocyano, $-NR_2$, $-NRNR_2$, $-CONR_2$ and $-R'CONR_2$ wherein R is selected from the group consisting of alkyl of 1 to 4 carbon atoms, phenyl and alkylphenyl in which the alkyl group contains from 1 to 4 carbon atoms, and R' is alkylene of 1 to 4 carbon atoms, and $n$ is an integer of 1 to 4.

References Cited in the file of this patent

UNITED STATES PATENTS

| | | |
|---|---|---|
| 1,942,386 | Stoesser | Jan. 2, 1934 |
| 2,240,935 | Lepin | May 6, 1941 |
| 2,858,190 | Jones | Oct. 28, 1958 |

UNITED STATES PATENT OFFICE
CERTIFICATE OF CORRECTION

Patent No. 2,986,450                      May 30, 1961

James R. Jones et al.

It is hereby certified that error appears in the above numbered patent requiring correction and that the said Letters Patent should read as corrected below.

Column 6, line 41, for "integer of 1 to 4" read -- integer of 1 to 14 --.

Signed and sealed this 21st day of November 1961.

SEAL)
Attest:

ERNEST W. SWIDER
Attesting Officer

DAVID L. LADD
Commissioner of Patents
USCOMM-DC